Feb. 5, 1929.
P. C. PINKERTON
1,700,989
AUTOMOBILE LOCKING DEVICE
Original Filed June 30, 1926    2 Sheets-Sheet 1
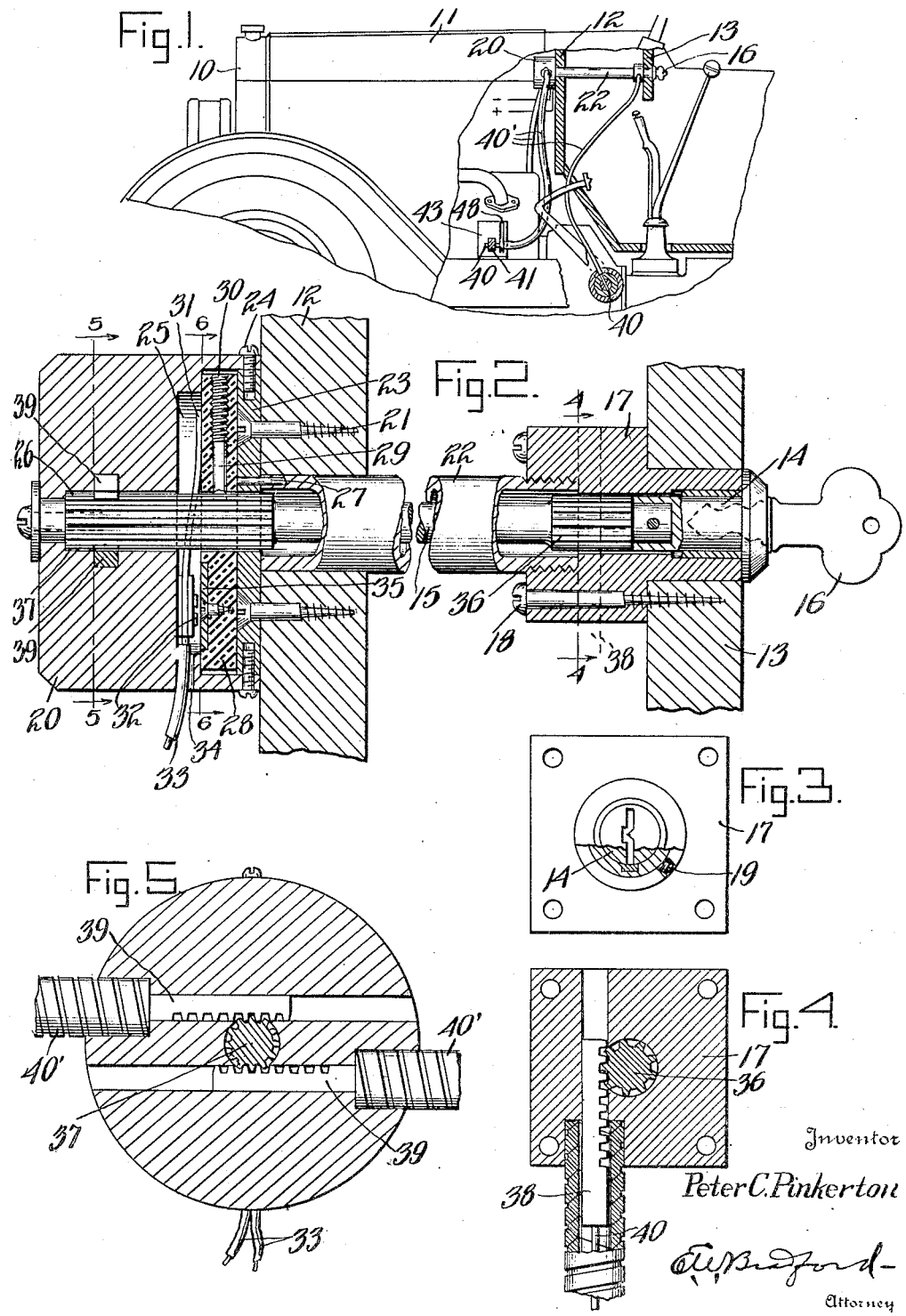
Inventor
Peter C. Pinkerton
Attorney Feb. 5, 1929.
P. C. PINKERTON
1,700,989
AUTOMOBILE LOCKING DEVICE
Original Filed June 30, 1926   2 Sheets-Sheet 2
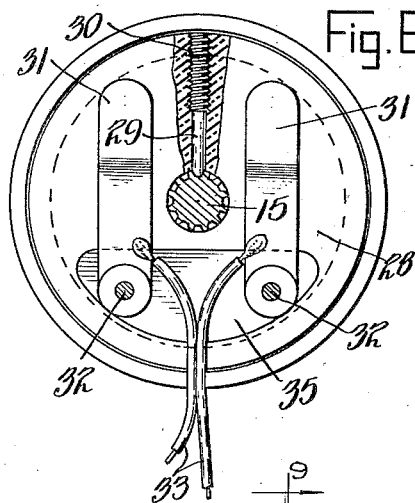
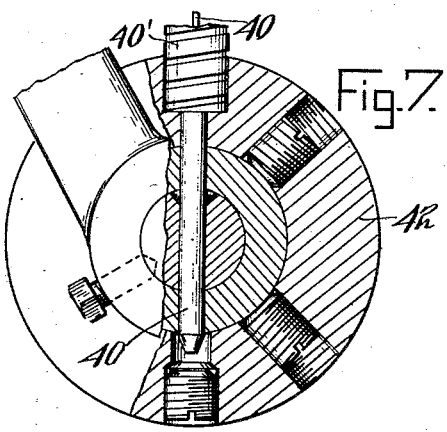
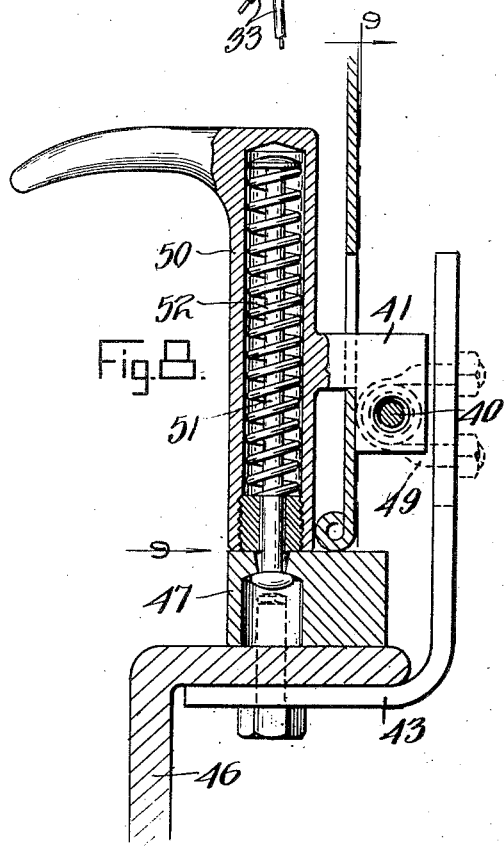
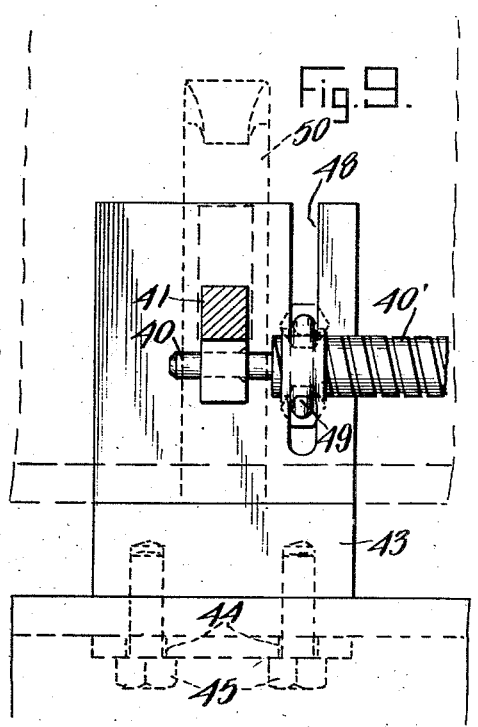
Inventor
Peter C. Pinkerton
By
Attorney Patented Feb. 5, 1929.

1,700,989

UNITED STATES PATENT OFFICE.

PETER C. PINKERTON, OF INDIANAPOLIS, INDIANA.

AUTOMOBILE LOCKING DEVICE.

Application filed June 30, 1926, Serial No. 119,689. Renewed April 2, 1928.

My said invention relates to a combined ignition, hood and clutch lock for automobiles and it is an object of the invention to provide a construction wherein the turning of a key in a lock conveniently located on the instrument board for making or breaking the ignition circuit will simultaneously lock or unlock the hood and clutch pedal.

A further object of the invention is to provide a device of this character having sufficient adjustment to render it capable of adaptation to various individual makes of automobiles to which it may be applied and which renders the parts beneath the hood inaccessible and practically incapable of being jimmied or burglarized to permit operation of the machine by an unauthorized person.

A further object of the invention is to provide a commercially practical, standardized construction, which will be easy to apply to any style car without changing the structure thereof and which not only can be manufactured and sold to dealers at a very small cost but can also be installed at practically negligible cost at the time the car is assembled at the factory.

Referring to the accompanying drawings which are made a part hereof and on which similar reference characters indicate similar parts, Figure 1 is a fragmentary side elevation of an automobile with parts broken away to show the application of my invention, Figure 2, an enlarged detail of a switch having an operating shaft extending through the dash and instrument board, Figure 3, a front elevation of the lock with parts broken away, Figure 4, a section on the line 4—4 of Figure 2, Figure 5, a section on line 5—5 of Figure 2, Figure 6, a section on line 6—6 of Figure 2, Figure 7, a detail of a fragment of a clutch pedal and mechanism for locking the same in depressed position, Figure 8, a section on the line 8—8 of Figure 9, and Figure 9, a section on line 9—9 of Figure 8.

In the drawings reference character 10 indicates an automobile having a hood 11, a dash 12 and an instrument board 13. A lock 14 preferably of the tumbler type having a bolt or shaft 15 adapted to be operated by a key 16, is mounted in a casing 17 on the instrument board 13 by means of screws 18, said lock is secured to said casing by means of a set screw 19. The forward end of the bolt 15 extends through the dash 12 and into a casing or housing 20 which housing is secured by means of screws 21, or other appropriate fastening elements to the forward face of the dash or on the opposite side of the same from the driver.

The bolt or shaft 15 is provided with a casing comprising a tube 22 which is preferably hardened by heat treatment to prevent the same from being mutilated so that access may be had to the lock bolt 15 and the rear end of the casing for the lock 14 is threaded for cooperation with threads on said tube or casing.

A removable closure plate 23 is provided for the housing 20 said plate being secured in position by means of screws 24 extending through the housing in spaced relation about the same.

The housing or casing 20 is formed with a chamber 25 within which the switch is mounted and a reduced cylindrical opening 25 is provided through the center of the housing from the chamber 25 and with a still smaller reduced portion 26 providing an annular bearing surface for the end of the shaft 15. The forward end of the heat treated casing 22 extends through the dash and is anchored to the plate 23 by means of a pin 27 while the rear end is prevented from rotating within the lock casing by means of the set screw 19.

A disk 28 of insulating material is mounted on the shaft 15 within the casing or housing 20 and said disk is held against rotation on said shaft by means of a pin 29 having a wedge-shaped or flattened inner end and adapted to be moved inwardly by means of a screw 30 threaded in behind the same. Spring contacts 31 are secured by means of screws 32 within said casing but insulated therefrom and wires 33 attached thereto extend out through an opening 34 in the side of the casing or housing 19. By this construction the disk will be caused to rotate when the shaft 15 is rotated and in order to complete the electric circuit I countersink a bridge-plate 35 on said disk, which is adapted to be operated to bridge the gap between the spring contacts 31. The shaft 15 is provided with gear teeth 36 and 37 on its ends which are adapted to engage rack bars 38 and 39 slidably mounted respectively within the lock casing 17 and in the switch casing 19. Longitudinal passages are provided through the casings 17 and 19 in substantially tangential relation to the openings which house the lock shaft 15, the rack bars mounted in such passages are therefore in position to be readily clutched by the gear teeth on the shaft 15. The openings through the casing 19 are preferably disposed on opposite sides of the opening for the shaft 15 in order that when the shaft is rotated the rack bars will be moved in opposite directions. Secured to the outer ends of the rack bars are flexible wires 40 incased in flexible tubular armor or casings 40′. The inner end of the casings 40′ are secured in the housings 17 and 19 and the outer ends of a pair of the casings 40′ are secured to a bracket adjacent the hood hooks 41 of the automobile, while the third casing 40 is secured to a collar 42 adapted to be clamped upon the boss in which the clutch lever is journaled and an aperture is provided through the shaft upon which the clutch lever is secured so that when the clutch lever or pedal is depressed the pin may engage the parts to hold the pedal in depressed position. Instead of mounting the rack within the lock casing 17 it could be mounted in the casing 19 under the dash and when in such position would be even more securely protected than if mounted in the position shown, also it is not necessary to provide a plurality of racks for engagement with the shaft 15 but only one rack is sufficient to which may be secured, by means of a branch coupling, a flexible armored tubing or casing and flexible wires may be disposed within the casing said wires running to the hood hooks and clutch pedal or other parts to be locked.

In order to securely fasten the hood hooks in position through the hood without exposing the fastening means I preferably provide a bracket 43 as shown in Figures 8 and 9 said bracket being substantially L-shaped and having a pair of slots 44 extending longitudinally of its shorter arm for adjustable engagement by bolts 45 for securing the bracket on the under side of the upper horizontal portion of the frame member 46 said bolts 45 also serving to secure in position supports 47 upon which the hood hooks 41 are pivoted. The longer arm of the bracket 49 secured about the casing 40′ for the flexible wires 39 and said bracket 49 is longitudinally adjustable in said slot 48 according to the height at which the locking portion of the hood hook 41 is disposed when the same is in locked position. My hood hooks are of conventional construction and each comprises a cylinder or barrel 50 with a bolt or fastening member 51 disposed within the same and between the end of said bolt or fastening member and the end of the barrel 50 is confined a spring 52, acting to force the barrel downwardly into engagement with its base or supporting block 47. When the parts are in locked position there will be no portion of the bolt 51 for the hood hook exposed so that an unauthorized person might cut the same for releasing the hood from locked position. Also the barrel 50 is in such close proximity to the hood that it is almost impossible to sever hooks 41 from the barrel upon which they are mounted.

In the operation of my device when the shaft 15 is operated by means of a key 16, the disk 28 having the bridge-plate 35 thereon will be rotated until the electrical contact is completed between the flexible contact fingers 31 and at the same time the racks which engage the shaft will be longitudinally reciprocated to project and retract the flexible wires and all the locking bolts or plungers with the cooperating locking elements adjacent the hood, clutch pedal and the like.

It will be understood from the foregoing that the parts are so constructed that each is individually manufactured and may be readily replaced if it becomes necessary. The device may be applied to automobiles while they are in the process of being assembled at the factory and my adjustable hood clamps with the adjustable locking means is designed to account for any variation in hoods which is very common in such constructions.

With a device of this character it will be next to impossible for an unauthorized person to gain access to the wiring system or other parts of the motor beneath the hood to render the machine capable of being operated. It will also be noted that there are practically no parts to become worn, the flat contacts insuring positive connection and the opening in the bottom of the casing below the contacts preventing any moisture that might accumulate in the casing to escape and prevent short circuiting. All pins are preferably subjected to heat treatment in order that they may be hardened to prevent shearing off.

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. A lock for automobiles comprising a shaft, an ignition switch associated with said shaft, a gear carried by said shaft, a rack associated with said gear, a locking bolt associated with said rack, a flexible element connecting said locking bolt and said rack said locking bolt being adapted to be longitudinally moved upon the rotation of said shaft, and means adapted to be engaged by said locking bolt for securing the same in position, substantially as set forth.

2. A lock for automobiles comprising a key-controlled rotary shaft, an ignition switch associated with said shaft, a gear carried by the shaft, racks associated with said gear, flexible elements carried by said racks, locking means for locking parts of the automobile in certain positions, bolts carried by said flexible elements adapted to be projected into and out of engagement with said locking means, substantially as set forth.

3. A lock for automobiles comprising a shaft, a switch associated with said shaft and adapted to be operated thereby, a gear carried by said shaft, racks associated with said gear, a flexible element secured to each of said racks, a locking bolt carried at the outer end of said flexible element, a casing for said flexible element having its outer end secured in fixed position, locking means for parts of the automobile adjacent the outer end of the casing whereby the shaft is operated to reciprocate the racks the locking bolts will be projected into and retracted from engagement with the locking elements, substantially as set forth.

4. The combination in an automobile of a hood, a housing mounted under said hood, a lock shaft extending into said housing, a plurality of fixed contacts in the housing, a bridge-piece carried by said lock shaft, flexible elements adapted to be reciprocated upon the rotation of said lock shaft, a casing for each flexible element, and locking means for locking parts of the automobile in predetermined position disposed adjacent the outer extremities of the flexible elements and adapted to be engaged thereby for holding them in locked position, substantially as set forth.

5. The combination in an automobile having a hood and a depressible clutch pedal, a housing mounted beneath said hood, an ignition switch mounted in said housing, operating means mounted in said housing and adapted to be manipulated for locking the hood in closed position, and a manually operable element disposed on the instrument board and having a shaft extending beneath said hood and supporting the movable element of said switch said shaft also supporting means for operating the hood operating elements, and a third locking element associated with said shaft and adapted to enter a recess in the clutch pedal shaft for maintaining the clutch pedal in depressed position, substantially as set forth.

6. The combination in an automobile of ignition circuit controlling means, means operable by said circuit controlling means for locking the hood in position and for securing the clutch pedal against operation, substantially as set forth.

7. The combination in an automobile of a casing beneath the hood, a lock shaft extending from the instrument board to said casing, a movable switch element mounted on said lock shaft, elements associated with said lock shaft adapted to be moved transversely of the same for locking various parts of an automobile, bearing elements for said lock shaft disposed adjacent the ends of the same and a passage through the bottom of said casing for the electric wires said passage also serving as a drainage opening, substantially as set forth.

8. A hood lock for automobiles comprising hood hooks, flexible elements, and members connected with said flexible elements and movable longitudinally into and out of engagement with the hood hooks, a bracket adjustably supported by the automobile frame, and a support for the flexible elements adjustably carried by said bracket, substantially as set forth.

9. The combination in an automobile of a frame, blocks bolted to said frame, fastening means for said blocks extending from the inside of the frame through the same and into said block, brackets secured between the head of said bolts and said frame said brackets extending upwardly on the inside of the hood, a hood hook secured to said blocks and having a lug for engaging through the hood, a casing adjustably supported by the upstanding end of the bracket in close proximity to said lug, and flexible elements reciprocable through the casing, and end members connected with said flexible elements and movable into engagement with said lugs for holding the hood hooks in position to maintain the hood closed, substantially as set forth.

10. The combination in an automobile having an instrument board and a dash of a casing mounted beneath the hood on said dash, a shaft extending into said casing at one end and having its other end mounted in the instrument board and controllable by a key from said instrument board, a switch mounted in said casing arranged to be closed when the shaft is operated, and means leading from said casing and operable by said shaft for locking the hood and clutch pedal, substantially as set forth.

11. A lock for automobiles comprising a key-controlled rotary shaft, an ignition-circuit switch connected to said shaft, a gear carried by said shaft, racks associated with said gear, a laterally flexible wire associated with each rack and provided at its outer end with a locking bolt, a laterally flexible casing anchored at its ends to suitable supports and encasing each wire so that the same may be pushed and pulled therethrough to project and retract its bolt, substantially as set forth.

12. A lock for automobiles comprising a key-controlled lock having a rotatable barrel, a support within which said barrel is journaled, said support being adapted to be secured to the instrument board of an automobile so as to expose the keyhole of the lock, a shaft secured to the lock barrel for rotation therewith and provided with a gear, a switch casing adapted to be secured to the dashboard beneath the hood of an automobile, the said shaft extending into said switch block, an ignition switch carried by the switch block and controlled by rotation of the shaft, racks associated with said gear, lock plungers associated with said racks, and adapted to engage hood-retaining means within the hood.

13. A lock for automobiles comprising a key-controlled lock having a rotatable barrel, a support within which said barrel is journaled, said support being adapted to be secured to the instrument board of an automobile so as to expose the keyhole of the lock, a shaft secured to the lock barrel for rotation therewith and provided with a gear, a switch casing adapted to be secured to the dashboard beneath the hood of the automobile, the said shaft extending into said switch block, an ignition switch carried by the switch block and controlled by rotation of the shaft, racks associated with said gear, lock plungers associated with said racks and adapted to engage hood-retaining means within the hood, another rack, a lock plunger associated with said rack, and means by which said plunger may be associated with the clutch lever of an automobile.

14. In an automobile a switch block mounted beneath the hood, a shaft associated with said switch block and carrying a movable switch element, a key-controlled lock having a rotatable barrel connected to said shaft, a support for said lock mounted in position to present the key-receiving portion of the lock for easy access, gear teeth carried by said shaft, racks mounted in the switch block and engaging said gear teeth hood-retaining members projectable into and withdrawable from the hood, lock plungers adapted to engage said hood hooks within the hood, and connections, protected by the hood, between said lock plungers and racks.

15. In an automobile a switch block mounted beneath the hood, a shaft associated with said switch block and carrying a movable switch element, a key-controlled lock having a rotatable barrel connected to said shaft, a support for said lock mounted in position to present the key-receiving portion of the lock for easy access, gear teeth carried by said shaft, racks mounted in the switch block and engaging said gear teeth, hood-retaining members projectable into and withdrawable from the hood, lock plungers adapted to engage said hood hooks within the hood, connections protected by the hood between said lock plungers and racks, another rack engaging the teeth of the shaft, a plunger lock connected with said rack, and means by which said plunger lock may be projected into and withdrawn from locking engagement with the clutch lever.

16. The combination in an automobile of means secured beneath the hood adapted to be operated for locking the hood in closed position, operating means for said first mentioned means, and means adapted to be actuated by the operating means for locking the clutch pedal in depressed position, substantially as set forth.

In witness whereof, I have hereunto set my hand at Washington, District of Columbia, this 11th day of June, A. D. nineteen hundred and twenty-six.

PETER C. PINKERTON.